United States Patent [19]

Wang et al.

[11] Patent Number: 5,177,488

[45] Date of Patent: Jan. 5, 1993

[54] PROGRAMMABLE FIBER OPTIC DELAY LINE, AND RADAR TARGET SIMULATION SYSTEM INCORPORATING THE SAME

[75] Inventors: Harry T. Wang, Thousand Oaks; Irwin L. Newberg, Northridge; Adrian E. Popa, Thousand Oaks; Robert R. Hayes, Calabasas; John K. Keigharn, Torrance; Bill H. Otoide, Manhattan Beach, all of Calif.

[73] Assignee: Hughes Aircraft Company, Los Angeles, Calif.

[21] Appl. No.: 773,187

[22] Filed: Oct. 8, 1991

[51] Int. Cl.[5] .............................................. G01S 7/40
[52] U.S. Cl. .................................. 342/167; 342/171; 342/172; 250/227.12
[58] Field of Search ...................... 342/167, 171, 172; 434/4; 250/227.12

[56] References Cited

U.S. PATENT DOCUMENTS 4,533,242 8/1985 McLaughlan et al. ............... 356/5
4,903,029 2/1990 Newberg et al. ..................... 342/172

Primary Examiner—T. H. Tubbesing
Attorney, Agent, or Firm—V. D. Duraiswamy; W. K. Denson-Low

[57] ABSTRACT

A programmable fiber optic delay system employs multiple programmable fiber optic delay lines, and switches among the delay lines for inclusion in an overall delay path. Switching among the delay lines is coordinated with the programming of those lines so that only a delay line with a settled delay program is included in the overall delay path. Each delay line consists of a plurality of fiber optic segments of varying length. The line's delay is programmed by switching in particular segments whose aggregate lengths correspond to a desired delay period. The multiple delay lines are used to simulate target speed and distance for use in testing a radar system. The programming of each individual delay line and the switching between lines is preferably controlled by a computer resident in the target simulator.

23 Claims, 2 Drawing Sheets

PROGRAMMABLE FIBER OPTIC DELAY LINE, AND RADAR TARGET SIMULATION SYSTEM INCORPORATING THE SAME

GOVERNMENT RIGHTS

This invention was made with Government support under N00019-89-C-0130 awarded by the Department of Navy. The Government has certain rights in this Invention.

BACKGROUND OF THE INVENTION

1. Field of the Invention

This invention relates to radar test systems, and more particularly to test systems capable of simulating target movement relative to the radar set.

2. Description of the Related Art

Modern radar systems employ complex waveforms and need to have their performance completely tested (from end to end) under controlled conditions. Test systems used to simulate a moving target are generally designed to return a copy or simulated copy of a transmitted radar pulse, after delaying or simulating the delay of the pulse by a period of time corresponding to the round-trip transit time to the target, with the addition of an expected Doppler frequency shift. The delay parameters are updated at regular intervals, corresponding to the target velocity and the desired range resolution, to simulate target movement.

The general approach to testing using delayed transmitted radar pulses has been to put a large target (such as a corner reflector or repeater) out at a distance from the radar so that a long delay is achieved because of the round trip time to this simulated target. This technique suffers from the fact that the radar signal is perturbed by the outside environment that is not under the control of the tester, and has several undesirable features. Excessive losses at radio frequency (RF) rule out the feasibility of using coaxial cables to provide long delay times. Surface acoustic wave delay lines are also lossy, with a limited RF bandwidth and delay time capability. Simulated target generators for radar testing can employ digital RF memory (DRFM) to simulate a moving target. Such a system employs sampling and analog-to-digital conversion techniques to store sampled waveform data of the transmitted radar pulses. However, DRFM introduces undesired frequency spurs (spectral impurities), has a reduced dynamic range and bandwidth because of the need for analog-to-digital conversion, and requires complex circuitry that has a relatively high power consumption. Also an RF target generator system can generate a simulated delayed radar pulse by using reference signals from the radar to generate the pulse in the same way the radar generates the signal that goes to the radar transmitter.

A recirculating fiber optic delay line/memory has also been proposed in P. R. Herczfeld, I. Koffman, A. S. Daryoush, R. Saedi, B. Even-Or and R. Markowitz, "A Fiberoptic Recirculating Delay Line", Proc. SPIE, Vol. 996, pp. 116-123 (1988). In this type of system the RF signal circulates repeatedly around a fiber optic loop, and is tapped off after the desired delay period. Although it employs a regenerative process to overcome losses, the noise buildup associated with the regeneration limits the number of recirculations and the technique needs perfecting.

A fixed fiber optic delay line is described in U.S. Pat. No. 4,903,029 to Newberg et al., and assigned to Hughes Aircraft Company, the assignee of the present invention. While this is a low loss delay mechanism, it incorporates a fixed delay that cannot be adjusted, and therefore can be used to simulate only a fixed target distance without any target movement.

SUMMARY OF THE INVENTION

The present invention seeks to provide a programmable signal delay mechanism for a radar test target simulator that can provide real time delay of the actual radar transmitted pulses and simulate long target distances, without excessive losses or corruption from outside environment while being located adjacent to the radar, and yet has both fine delay resolution and long delay times so that it can simulate a broad range of distances and target speeds. A relatively wide RF bandwidth, the avoidance of undue complexity and low noise levels are further goals of the invention. Also, the simulation of an ideal target signal return to the radar is achieved without or with only a minimum number of control signals from the radar. This is a unique and desired capability of a test set that is not provided by other types of target simulators.

The new radar target speed and distance simulation system employs a minimum of two optical fiber delay lines. At any given time, only one of these lines is being used to provide the delay. This line, the active line, has the correct length for the distance being simulated. While this active line is being used, the inactive line(s) are being reconfigured for new simulated distances. This reconfiguration consists of changing the line length by switching in or out incremental lengths of line, flushing the unwanted information out of the line, allowing the mechanical switching transients to decay, and reloading the line with a properly sequenced signal. At the appropriate time this properly prepared second line is selected to provide the delay, and the first line becomes inactive. Because line selection is performed with a very high speed optical or microwave switch, the flow of data is essentially uninterrupted.

Each delay line includes a plurality of fiber optic segments having predetermined optical delays, and a switching scheme for connecting into an aggregate delay line only those segments which accumulate to the desired delay. In the preferred embodiment different segments have different lengths and correspondingly different delay periods, and are arranged in a binary progression. The selected segments are switched into the aggregate delay line; optical bypasses are switched into the aggregate delay line for the undesired segments. Optical amplifiers are incorporated into the overall delay line to compensate for losses; the amplifiers are preferably located between adjacent segments of shorter length, and within segments of longer length.

A computer can be used to program the individual delay lines and control the switching among those lines. The output radar signal is sampled by either direct coupling or via an antenna to receive some of the radar's radiation, and modulated onto the optical signal of the opto-electronic transmitter for processing through the optical delay system. The output of that system is converted back to an electrical signal that is a nearly ideal replica of the radar's transmitted signal and fed back to the radar as a simulated radar target at a selected range (delay) and speed (velocity).

The multi-line approach allows one to use relatively slow mechano-optical or thermo-optical switches to change the length of the inactive line, while maintaining an uninterrupted flow of delayed signal through the active line. Mechano-optical switches have low loss and low crosstalk, properties that are necessary for ultra-long, high-resolution programmable delay lines. The two-line approach also allows one to unambiguously remove "incorrect" information from the line, and to reload it with correct information (i.e., a properly sequenced signal train). Proper sequencing is essential for accurate replication of radar echoes.

These and other features and advantages of the invention will be apparent to those skilled in the art from the following detailed description, taken together with the accompanying drawings, in which:

DETAILED DESCRIPTION OF THE INVENTION

Figure 1:
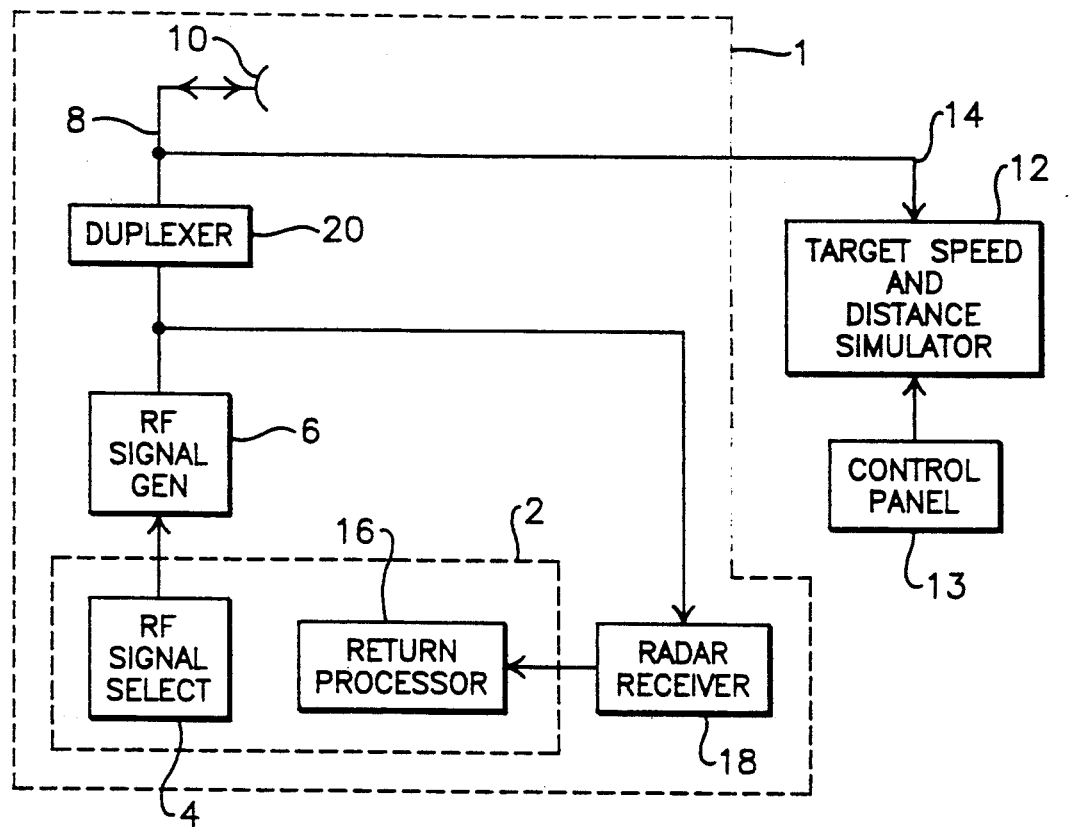
FIG. 1 is a block diagram of a radar target speed and distance simulation system in accordance with the invention.

FIG. 1 presents a summary block diagram of the new target speed and distance simulator connected to a radar system 1. The radar system processor includes a computer 2 that selects the characteristics of the radar RF signal to be transmitted; this function is indicated by block 4. The desired signal is produced by an RF signal generator 6 and delivered via a duplexer 20 and line 8 to an antenna 10, which typically will also provide a reception in a radar transceiver system.

The target speed and distance simulator system of the present invention is indicated by block 12. An input line 14 can tap the RF signal on line 8 and deliver at least a portion of that signal to the simulator system. A sample from the radar for input line 14 could also be obtained from several other places, such as the output of antenna 10 or elsewhere within a typical radar system. This system block 12 produces a controlled initial delay signal that simulates a target distance from the radar set, and periodically updates the delay at a controlled rate to simulate a target speed relative to the radar set based on an input from simulator operator control panel 13. These simulation parameters are typically provided by a computer that is part of the simulator and that is set up by the front panel 13 set of controls. The delayed signal output from the simulator is delivered back to the radar system, which processes this "ideal" signal as if it were real to determine the simulated target speed, range and other typical radar parameters. The signal returned to the radar can be connected back to the radar receiver 18 either via the radar duplexer 20 or by radiating into antenna 10. From the return receiver 18 the signal is delivered to a return processor 16 that decodes the signal to calculate the simulated target speed and range. The return processor 16 can conveniently be implemented by the computer 2 that is already resident in the radar processor system.

Typical modern airborne radar can have a long range (up to about 80 nautical miles) and high resolution (about 25 feet) capability. This translates into a simulator signal delay requirement of up to about 1,000 microseconds to simulate this maximum radar range. To adequately test radar range resolution, and to smoothly simulate target motion, this delay must be changeable in increments as small as 50 nanoseconds.

The present invention uses optical fibers, which have a wide bandwidth and extremely low optical loss (about 0.2 db/km), to achieve this range of delays. The basic approach is to convert a sample of the radar transmitted signal into an amplitude modulated light wave, which is then transmitted through a programmed length of optical fiber to produce the desired time delay. The modulated light signal is demodulated at the end of the fiber and, after shifting the output electrical signal by the proper Doppler frequency shift, a simulated radar return signal is obtained that can be used to evaluate the end-to-end performance of the entire radar. This use of the radar as its own tester by returning a delayed ideal replica simulated target is an excellent way to evaluate radar system end-to-end (total) performance. Other types of radars with different parameters of range, range rate and range resolution capability can also be simulated by designing a simulator with different parameters then the typical values stated above.

Figure 2:
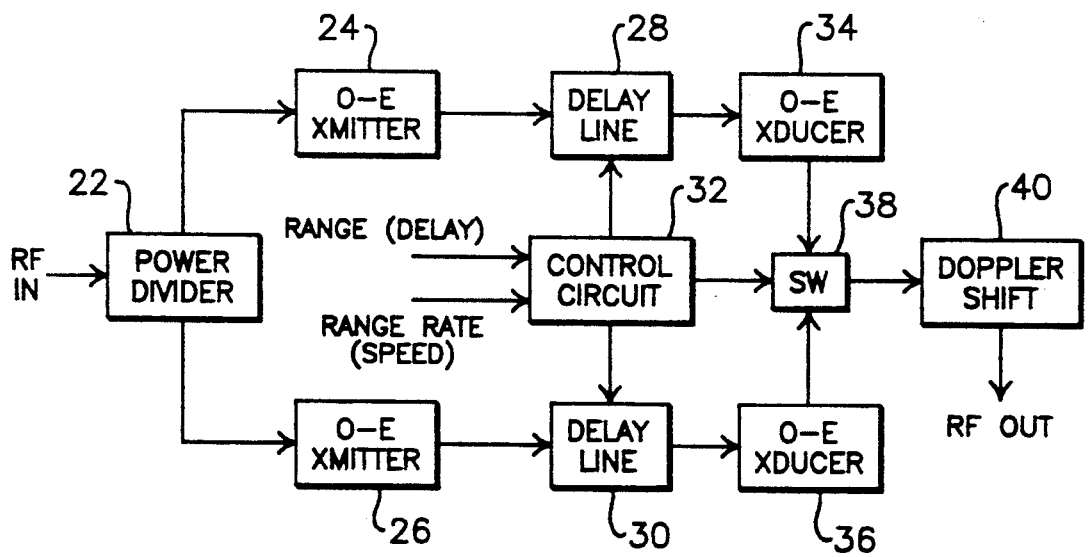
FIG. 2 is a block diagram of the multiple optical delay line speed and distance simulator.

A block diagram of the present simulator 12 in FIG. 1 is provided in FIG. 2. The signal from the radar in FIG. 1 is split by an RF power divider 22, and each divided portion is used to modulate respective low noise opto-electronic transmitters 24 and 26. The opto-electronic transmitters can be directly modulated lasers or external modulators. While two opto-electronic transmitters and corresponding delay lines are shown in FIG. 2, the system could be expanded to incorporate three or more separate delay lines if desired. Instead of dividing the input RF signal, it could be used to modulate a single opto-electronic transmitter, with the transmitter output then split between the various delay lines with an optical splitter.

Each opto-electronic transmitter 24, 26 transmits an RF-modulated optical beam to corresponding fiber optic delay lines 28, 30. The delay which these lines add to their respective optical signals is controlled by the computer in the simulator 12 via appropriate control interface circuitry 32.

The delayed optical outputs from the delay lines 28, 30 are converted to electrical signals by opto-electric transducers 34, 36, respectively, which are preferably implemented as photodiodes. The electrical outputs from transducers 34 and 36 are presented to a conventional RF switch 38 that selects the signal from only one line at a time. Optical switching means could also be used if they have fast switching times. The signals presented to the switch can be from DC through the microwave frequency range (from about 100 MHz to 100 GHz), depending upon the capability of the photonic components used. The operation of switch 38 is controlled by the computer in the simulator 12, via control interface 32. While a first delay line is being programmed with a desired delay period, and during the settling time for this programmed line, the switch 38 connects the second line (which already has a settled programmed delay), to the simulator output. The second line's delay is thus provided as the output for the overall simulator. To vary the delay period, the first line is reprogrammed with a new delay period. Once the first line has settled at its new delay, the switch is actuated by the simulator computer to disconnect from the second delay line and connect to the first delay line, thus changing the simulator's output delay to the newly programmed delay of the first line. The second delay line, which is disconnected from the delay output at this time, can now be reprogrammed with a new delay period of its own. The switch 38 continues to alternate between the two delay lines, with the disconnected delay line reprogrammed while the other delay line provides the simulator output. In this fashion an almost constant output is produced from the simulator, with a rapid updating capability. In addition to allowing settling time for the optical switches, the switching between delay lines also allows the line to be emptied and reloaded with new data pulses. Thus the maximum switching rate between lines is determined by the optical switch settling time or the line load time for new pulses, whichever is longer; this maximum switching rate along with the delay line range resolution determines the maximum closing target speed that can be simulated.

A conventional RF switch 38 is capable of operating at speeds of up to about 100-200 MHz. However, it requires about 6 msec to reprogram the fiber optic delay lines, including settling time for a reprogram delay. The operation of switch 38 is synchronized with the reprogramming of the multiple delay lines 28, 30, and is thus operated at a rate far below its capacity. The dead time during which no useable signal is produced by the simulator is thus reduced to a very low level that is determined by the switching time of the high speed RF switch 38, which can be as low as a few nanoseconds.

A Doppler frequency shift circuit 40 of conventional design is connected to the output of switch 38. The addition of a Doppler shift to the radar signal delay provides a complete simulation of a target moving either towards or away from the radar set. To add the correct Doppler shift to the target, both the target speed (operator selectable) and radar radiated frequency (not necessarily known) must be utilized. In this test set the radar frequency is measured by a commercial unit so that it does not have to be sent from the radar as a data input, and thus the test set can be independent of radar control signals; this is a desired feature of this test target simulator. An additional fiber optic delay line at the input to the simulator, not shown in FIG. 2, is used to delay the input signal long enough for the external (to radar) commercial frequency measuring unit to measure the radar frequency and set up the correct Doppler shift for the frequency of the delay line output.

Figure 3:
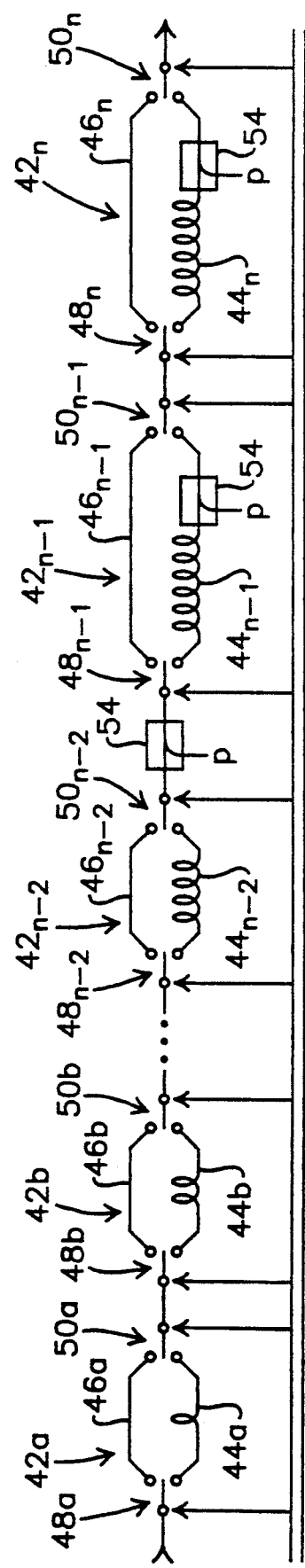
FIG. 3 is a schematic diagram of one of the optical delay lines incorporated in the overall simulator.

The two delay lines 28 and 30 are preferably identical. A preferred structure for each delay line is shown in FIG. 3. The delay line is broken into a series of individual fiber optic delay segments $42_a$, $42b$, ... $42n-2$, $42n-1$, $42n$, where n in the total number of delay segments. Each segment consists of a coiled length of optical fiber $44_a$, $44b$, etc., and a short adjacent length of optical fiber $46_a$, $46b$, etc. whose length produces a negligible delay. The coiled length and negligible delay length form two selectable signal paths, and a switch on each end can be used to switch between them. The lengths of the optical fiber coils preferably form a binary sequence in the form L times $2^k$, where L is a unit of optical fiber delay in the coiled segment and is given in seconds, and k is the order of a given fiber segment. The segments accordingly provide respective delay times of L times $2^k$ seconds each. If T is the total number of binary segments, then the total line length is $2^T-1$ times L seconds. In the preferred embodiment 14 segments are used, with the first 13 segments arranged in a binary progression and the length of the 14th segment equal to that of the 13th. To obtain a simulated range of up to 80 nautical miles and a range resolution of 42 feet the length of the first segment $44_a$ is 17 m, which produces a delay in the fiber optic cable of about 83 nsec. This length increases up to the 13th segment $44_{n-1}$, which is about 70 km long. With the final segment $44_n$ also about 70 km, the total length of the delay line when all of the segments are connected together in series is about 208 km; this provides an upper limit delay of about 1 millisecond, which corresponds to a maximum radar range of about 80 nautical miles.

$1 \times 2$ switches $48_a$, $48b$, ... $48_{n-2}$, $48_{n-1}$, $48_n$ are provided at the input end of each delay segment, while similar switches $50_a$, $50b$, ... $50_{n-2}$, $50n$, $50_n$ are provided at the output of each delay segment. The switches 48 and 50 are connected to select between their respective delay lines $44_a$, $44b$, etc. and the optical bypasses to those lines $46_a$, $46b$, etc. for inclusion in an aggregate delay line. Control over the various switches is provided from the control interface 32 over a control interface bus 52.

A desired overall delay is implemented by selecting individual segments whose total delay adds up to the desired amount, switching the segments into the aggregate delay line, and switching in the bypasses for the other segments into the aggregate line. The delay period is reprogrammed by altering the switching pattern so that a new combination of delay segments, whose individual delays total to the new desired overall delay, are included in the aggregate delay line.

While fast operating electro-optic devices could be used for the switches 48 and 50, these devices also have high insertion losses. It is therefore desirable to use electro-mechanical switches, which have relatively low insertion losses. Electro-mechanical switches, however, also have considerably lower switching speeds than electro-optic switches. The parallel programmable delay line architecture of the present invention permits the use of electro-mechanical switches without limiting the overall simulator to their relatively slow switching speeds.

Although the losses associated with optical fibers are very low on a per unit length basis, the long aggregate length of the various optical fiber segments can result in appreciable cumulative losses. To compensate for such losses, in-line fiber optic amplifiers 54 may be employed. Such amplifiers are preferably of the erbium-doped type, which are characterized by low noise, high gain and polarization insensitivity. For the shorter segments it is generally sufficient to locate an amplifier between a pair of adjacent segments, while for the longer segments such as $42_{n-1}$, $42n$ it may be desirable to integrate an amplifier in with the segment. The amplifiers 54 are pumped with respective pump lasers p. For economy, a high power laser can be used with a power divider to pump the several amplifiers 54.

While a particular embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. A programmable fiber optic delay line system, comprising:
   a plurality of fiber optic delay lines, each delay line having a programmable delay period, and a plurality of fiber optic segments having predetermined optical delays, wherein said segments are switchable into the delay line in series with the other segments in said line;
means for programming said plurality of delay lines with respective series of delays;
a switch for switching between said plurality of delay lines so that only a delay line having a settled delay is connected to an output, and
a plurality of optical amplifiers in each of said plurality of delay lines.

2. The programmable fiber optic delay line system of claim 1, wherein some of said optical amplifiers are located between adjacent segments, and some are located within a segment.

3. The programmable fiber optic delay line system of claim 1, said segments having a plurality of different lengths with correspondingly different delays, wherein at least some of said optical amplifiers are located between adjacent segments of shorter length, and at least some are located within a segment of longer length.

4. A programmable fiber optical delay system, comprising:
a plurality of fiber optic delay lines, each delay line having a programmable delay period,
means for switching among said delay lines for inclusion in a delay path,
a control circuit for programming said delay lines with respective series of delays and for coordinating said switching means with the programming of said delay lines so that only a delay line with a settled programmed delay is included in said delay path.

5. The programmable fiber optic delay system of claim 4 further comprising means associated with each delay line for generating optical signals for transmission along their respective delay lines in response to a radio frequency (RF) input signal, and means for converting said optical signals back to an RF output signal.

6. The programmable fiber optic delay system of claim 4, each delay line further comprising an opto-electric transducer for converting its delayed optical signal to an electrical signal, said switching means selecting among said electrical signals for inclusion in said delay path.

7. The programmable fiber optic delay system of claim 4, each of said delay lines comprising a plurality of fiber optic segments having predetermined optical delays, said programming means comprising means for switching desired segments into each delay line.

8. The programmable fiber optic delay system of claim 7, wherein for each delay line at least some of said segments have different lengths with correspondingly different delays.

9. The programmable fiber optic delay system of claim 7, wherein for each delay line said segments are switchable into said delay line in series.

10. The programmable fiber optic delay system of claim 9, wherein for each delay line at least some of said segments comprise a binary progression of respective lengths and delay times.

11. The programmable fiber optic delay system of claim 9, wherein for each delay line each of said segments has an associated fiber optic segment with a relatively negligible delay, said switching means selecting between each of said delay segments and their associated negligible delay segments for inclusion in said series delay line.

12. The programmable fiber optic delay line of claim 9, further comprising a plurality of optical amplifiers in each delay line.

13. The programmable fiber optic delay line of claim 12, wherein for each line some of said optical amplifiers are located between adjacent segments, and some are located within a segment.

14. The programmable fiber optic delay line of claim 12, wherein for each line said segments have a plurality of different lengths with correspondingly different delays, at least some of said optical amplifiers are located between adjacent segments of shorter length, and at least some are located within a segment of longer length.

15. A radar target speed and distance simulation system for operating on at least a portion of a radar signal and supplying a delayed signal which incorporates the delay of a delay path back to a radar processor as simulated distance radar target return, comprising:
a) means for converting said portion of the radar signal into a corresponding optical signal,
b) a programmable fiber optic delay system for delaying said optical signal by a time period corresponding to a simulated target distance, said delay system comprising:
1) a plurality of fiber optic delay lines, each delay line having a programmable delay period,
2) means for switching among siad delay lines for inclusion in a delay path, and
3) a control computer comprising means for programming said delay lines, with respective series of delays corresponding to a simulated speed of target movement and for coordinating said switching means with the programming of said delay lines so that only a delay line with a settled programmed delay is included in said delay path, and said optical signal emerges as a delayed optical signal after passing through said delay path; and
c) means for converting said delayed optical signal into a corresponding electrical signal which comprises said delayed signal.

16. The radar target speed and distance simulation system of claim 15, each delay line further comprising an opto-electric transducer for converting its delayed optical signal to an electrical signal, said switching means selecting among said electrical signals for inclusion in said delay path.

17. The radar target speed and distance simulation system of claim 16, wherein for each delay line at least some of said segments have different lengths with correspondingly different delays.

18. The radar target speed and distance simulation system of claim 16, wherein for each delay line said segments are switchable into said delay line in series.

19. The radar target speed and distance simulation system of claim 18, wherein for each delay line at least some of said segments comprise a binary progression of respective lengths and delay times.

20. The radar target speed and distance simulation system of claim 18, wherein for each delay line each of said segments has an associated fiber optic segment with a relatively negligible delay, said switching means selecting between each of said delay segments and their associated negligible delay segments for inclusion in said series delay line.

21. The radar target speed and distance simulation system of claim 15, wherein said signal supplying means includes means for converting the delayed optical signal to a radio frequency (RF) radar target signal.

22. The radar target speed and distance simulation system of claim 15 further comprising a Doppler frequency shift circuit for adding a Doppler shift to said delay signal.

23. The radar target speed and distance simulation system of 22 wherein said Doppler frequency shift circuit comprises means for measuring the radar frequency.

* * * * *